United States Patent [19]

Shutt et al.

[11] Patent Number: 5,264,192
[45] Date of Patent: Nov. 23, 1993

[54] METHOD FOR DETOXIFYING CYANIDE-CONTAINING WATER

[76] Inventors: Thomas C. Shutt, 1515 E. 9th Ave. #212, Denver, Colo. 80218; Richard H. Eaman, 5200 Zinnia St., Arvada, Colo. 80004

[21] Appl. No.: 886,625
[22] Filed: May 21, 1992
[51] Int. Cl.$^5$ .......................... C02F 1/52; C22B 11/08
[52] U.S. Cl. ........................ 423/29; 423/143; 423/379; 423/371; 588/246
[58] Field of Search .................. 210/702, 904; 423/29, 423/143, 379, 371; 588/246

[56] References Cited

PUBLICATIONS

Clennell, J. E., *The Cyanide Handbook*, McGraw-Hill (1915), pp. 102-132.
Thomas, R. (ed.), *E/MJ Operating Handbook of Mineral Processing*, McGraw-Hill, Inc., pp. 22-23 (1977).
*The Making, Shaping, and Treating of Steel*, a publication of the United States Steel Company, Pittsburgh, Pa., 6th ed. (1952), pp. 935-939.

*Primary Examiner*—José G. Dees
*Assistant Examiner*—Joseph Conrad
*Attorney, Agent, or Firm*—Jay K. Malkin

[57] ABSTRACT

A method for treating cyanide-contaminated water in order to remove dissolved (e.g. free) cyanide (HCN and/or $CN^-$) therefrom. Cyanide-contaminated water is a significant problem in the gold processing industry wherein cyanide compounds are used to remove gold from ore. The remaining cyanide solution after gold extraction is treated to reduce free cyanide levels therein by combining the solution with a crystalline waste by-product of the metal galvanizing industry having the following formula: $(Fe\cdot Zn)SO_4\cdot 7H_2O$. This material preferably has a zinc content of about 1-14% by weight, and is added to the water in an amount equal to about 1-5 pounds per ton of ore being processed. As a result, a stable, solid, non-toxic complex is produced from the toxic free cyanide materials. This is accomplished without the generation of harmful acids, heavy metals, excessive iron levels or other undesired by-products.

20 Claims, 6 Drawing Sheets

METHOD FOR DETOXIFYING CYANIDE-CONTAINING WATER

BACKGROUND OF THE INVENTION

The present invention generally relates to the treatment of contaminated water, and more particularly to the detoxification of cyanide-containing water.

An important factor to consider in any industrial process is its environmental impact. With the enactment of strict environmental legislation, a constant need exists for effective pollution control procedures. This is especially true regarding the decontamination/detoxification of water. Substantial research has been conducted involving methods for removing heavy metals, organic contaminants, particulates, and the like from water used in industrial/commercial processes.

With respect to the removal of contaminants, an unusually difficult problem involves the removal of free cyanide from water so that the water may be detoxified. The term "free cyanide" as used herein shall include but not be limited to HCN and/or free, dissolved $CN^-$ ions. For example, significant and substantial amounts of contaminated water containing free cyanide are generated in the gold mining/processing industry. Nearly all gold mines currently operating throughout the world treat substantial amounts of solid rock in order to recover small quantities of gold therefrom. It is currently estimated that a ton of gold ore typically contains about 0.04–0.20 ounces of gold. Thus, effective extraction processes are necessary in order to treat large amounts of solid rock in an effective and economical manner.

Two basic gold extraction procedures are used by most modern gold processors, namely, (1) the isolation of gold from powdered rock (ore) and (2) the isolation of gold from coarse-crushed rock (ore). With respect to process (1), mined rock is first crushed into a fine powder having an individual average particle size of about 200 U.S. standard mesh. The powder is then combined with a water solution containing free cyanide ions ($CN^-$) therein (e.g. produced by combining water with NaCN, $Ca(CN)_2$, or other comparable materials known in the art for gold processing). As a result, the free cyanide ions in the solution react with the gold contained within the powdered rock in order to extract the gold therefrom. Extraction of the gold is accomplished by the production of a water-soluble gold cyanide complex from the free cyanide ions and the gold removed from the rock. This complex consists of $NaAu(CN)_2$ when NaCN is used and $CaAu(CN)_3$ when $Ca(CN)_2$ is used as indicated above. The solution with the gold cyanide complex therein is then treated in order to recover metallic gold therefrom. This is typically accomplished by the precipitation of metallic gold from the solution onto a bed of metallic zinc in accordance with the following reaction which, for example purposes, involves the precipitation of metallic gold from $NaAu(CN)_2$:

$$NaAu(CN)_2 + 2NaCN + Zn + H_2O \rightarrow Na_2Zn(CN)_4 + Au + H^+ + NaOH \quad (1)$$

Gold is electronegative to zinc in cyanide solutions, thereby enabling zinc to act as a precipitating agent with respect to the water-soluble gold cyanide complex described above. Basic conceptual information on the above reaction and other information on gold processing is discussed in greater detail in Clennell, J. E., *The Cyanide Handbook*, McGraw-Hill, Inc., pp. 102-132 (1915) which is incorporated herein by reference.

Once the metallic gold is extracted and obtained, a slurry remains which consists of the treated, powdered rock in combination with water having a high residual free cyanide level. The powdered rock and water are ultimately retained within large collecting ponds as described in greater detail below. In time, the powdered rock settles, thereby separating the rock from the water. The water at this stage contains about 70–180 ppm of free cyanide therein, and is thereafter recycled back into the gold processing system.

However, significant environmental problems occur with respect to the ponds of cyanide-containing water which remain outside in the environment (at least temporarily). At the cyanide concentration levels indicated above (e.g. about 70–180 ppm), the pond water is lethal to animal life (e.g. birds and water fowl). In prior years, substantial amounts of water fowl have died after drinking from ponds having cyanide-containing water therein produced in accordance with the foregoing process. To control this problem in the United States, the U.S. Environmental Protection Agency has prepared voluntary guidelines suggesting that gold producers reduce free cyanide levels in treatment water to less than about 50 ppm. Various conventional methods exist for accomplishing this reduction. These methods will be described in greater detail below.

Regarding process (2), low grades of gold ore are crushed into individual portions of rock and arranged in piles, with each pile being placed on an impermeable pad (e.g. made of rubber). Each individual portion of rock is about 1–4 inches in diameter. In addition, each pile is typically about 30–50 ft. high and occupies about $10^7$ to $3 \times 10^7$ $ft^3$. A cyanide ion-containing solution of the type described above in process (1) is then allowed to trickle downwardly through the pile and into the individual portions of rock which are substantially porous. This enables penetration of the cyanide solution throughout the interior of the rock. Extraction of the gold is again accomplished by the production of a water-soluble gold cyanide complex from the free cyanide ions and the gold removed from the rock. Metallic gold is thereafter recovered from the gold cyanide complex as indicated above in process (1) and described generally in Clennell, J. E., supra. Once the metallic gold is extracted, the remaining solution which contains residual free cyanide therein is reused on other piles of rock.

The immediate environmental problems caused by the large ponds described above in process (1) do not exist when process (2) is used. Specifically, large ponds of cyanide-containing water do not exist in process (2). Instead, process (2) generates ponds which are sufficiently small (e.g. about 1,000 $ft^2$) to be covered with protective wire mesh. This is in direct contrast with the ponds described above in process (1) which may actually cover many (e.g. about 200) acres. However, problems result in process (2) when the piles of rock being treated have all of the desired gold removed therefrom. At that point, the rock is ready for return to the environment. However, any cyanide-containing water retained therein, as well as any other residual water left over in the small ponds after termination of mining operations must be treated so that the water may be detoxified. Specifically, the residual water must be treated so that the free cyanide levels therein are below about 0.2 ppm. This is the level necessary to place the water in compliance with most local ground water standards in the United States.

In order to detoxify the water used in gold processing operations (and in other processes which generate or produce considerable amounts of free cyanide-containing water), a number of chemical treatment methods have been developed. These methods basically fall into two categories: (A) oxidation; and (B) complexing. With respect to oxidation, various chemicals exist which oxidize $CN^-$ to $CNO$. These materials include $SO_2$, $H_2O_2$, and selected hypochlorites. The oxidation of $CN^-$ to $CNO$ is beneficial in that $CNO$ is less toxic than $CN^-$.

However, oxidants have a number of inherent disadvantages. For example, the foregoing oxidants are significantly expensive (e.g. about $5-$10 dollars (U.S.) per 1,000 gallons of liquid being treated). In a large-scale gold processing operation, the use of oxidants can therefore become prohibitively expensive. Also, the foregoing oxidants may attack the cyanide-treated rock materials and liberate various heavy metals contained therein (e.g. Cu, Cr, As and others). This produces additional pollution problems and may, in fact, cause violations of applicable ground water regulations involving excessive heavy metal concentration levels. Finally, oxidants reduce the pH of the water being treated to about 6.9 or less which may also cause a lack of compliance with applicable ground water regulations.

The other conventional treatment method involves complexing free cyanide materials to form a variety of chemical complexes in which the materials (e.g. $CN^-$ ions) become "unavailable" in accordance with the alleged stability of the resulting complexes. However, the complexing agents must be selected very carefully or significant problems will result. For example, the use of sodium, potassium, or calcium salts (e.g. sulfates, nitrates, chlorides, and the like) will produce NaCN, KCN, and/or $Ca(CN)_2$ as reaction products. These products are very soluble in water, and will ultimately dissociate to produce toxic free cyanide ions in solution. Regarding the use of metal salts (e.g. sulfates, nitrates, chlorides, and the like) involving Zn, Ni, Cu, Co and/or Cd, other problems can occur. While Cu and Ni salts may produce relatively stable cyanide complexes (e.g. $Cu(CN)_2^-$ and/or $Ni(CN)_4^{-2}$), such materials, themselves, constitute undesirable heavy metal contaminants which produce a variety of potential pollution problems. Also, the use of Cd salts offers two disadvantages. First, Cd forms a relatively weak cyanide complex ($Cd(CN)_3^-$) which readily dissociates to produce free cyanide ions. Also, it introduces cadmium ions into the treatment process which can present significant pollution/toxicity problems. The same problem exists when Co salts are used. While stable complexes may result (e.g. $Co(CN)_6^{-4}$), such complexes offer considerable toxicity problems.

Tests conducted on the use of zinc salts for treating cyanide-contaminated water have indicated that a cyanide reaction product is produced consisting of $Zn(CN)_2$. However, in the presence of excess free cyanide ions, this material reacts to form $Zn(CN)_4^{-2}$. While this compound is of minimal toxicity compared with Co, Cd, and/or Ni complexes, it is relatively unstable, and ultimately dissociates at a significant rate, thereby again producing free cyanide ions. Thus, zinc salts (e.g. sulfates) are not desirable for use alone or in conjunction with other compounds by gold processors and the like for cyanide decontamination.

The most commonly used cyanide removal/complexing agent involves ferrous sulfate ($FeSO_4$), with the heptahydrate form ($FeSO_4 \cdot 7H_2O$) being preferred. Unless otherwise indicated, use of the term "ferrous sulfate" herein shall signify use of the heptahydrate form. Ferrous sulfate generally reacts with free cyanide ions as follows:

$$Fe^{+2} + 6CN^- \rightarrow Fe(CN)_6^{-4} \qquad (2)$$

In turn, the $Fe(CN)_6^{-4}$ will thereafter react with additional $Fe^{+2}$ ions to produce an insoluble ferrocyanide having the following formula: $Fe_2[Fe(CN)_6]$. This material is significantly stable, and does not readily dissociate to produce free cyanide ions. In addition, the use of ferrous sulfate heptahydrate involves much lower material costs compared with the oxidants described above. While the foregoing oxidants typically cost about 5-10 dollars (U.S.) per 1,000 gallons of contaminated liquid, ferrous sulfate heptahydrate costs about 1 dollar (U.S) per 1,000 gallons of contaminated liquid. However, the use of ferrous sulfate heptahydrate also presents a disadvantage which must be carefully considered. Specifically, ferrous sulfate heptahydrate typically contains about 1-2% free sulfuric acid ($H_2SO_4$). When the ferrous sulfate heptahydrate reacts to form the cyanide compositions listed above, the sulfuric acid (which is a strong oxidant) may then attack any rock materials it comes in contact with (e.g. when piles of rock (ore) are treated after the removal of gold therefrom). As a result, heavy metals (e.g. Cu, Ni, and the like) which may be contained within the rock are liberated. This can cause significant environmental problems as noted above. In addition, when ferrous sulfate heptahydrate reacts to form the above-described cyanide complexes, it also liberates $Fe^{+2}$ ions into the treated water, thereby causing possible failure of the water to meet applicable ground water standards for dissolved iron content. For example, in process (1) described above, the use of ferrous sulfate heptahydrate will create a high dissolved iron content in the slurry ponds of about 40 ppm. To meet most local United States ground water regulations, the dissolved iron content of the water must thereafter be reduced to about 0.3 ppm.

Accordingly, a need exists for a cyanide-containing water detoxification method which:

(1) is economical to use;
(2) is effectively usable in gold processing operations which involve cyanide treatment materials;
(3) produces a stable, non-polluting, non-toxic reaction product which, if desired, is readily isolated and removed from the remaining solution; and
(4) avoids the production of harmful by-products, including but not limited to acids and heavy metals.

The present invention enables the detoxification of cyanide-contaminated water in a highly effective manner while satisfying all of these goals as described in greater detail below.

SUMMARY OF THE INVENTION

It is an object of the present invention to provide an effective method for detoxifying cyanide-containing water.

It is another object of the invention to provide a chemical agent for effectively detoxifying cyanide-con taining water which is readily available at a minimal cost.

It is a further object of the invention to provide a chemical agent for effectively detoxifying cyanide-containing water which is especially suitable for gold processing operations which use cyanide materials as gold extracting agents.

It is a further object of the invention to provide a chemical agent for effectively detoxifying cyanide-containing water which avoids the extraction of harmful oxidative by-products from cyanide-treated rock materials, including but not limited to heavy metals.

It is a still further object of the invention to provide a chemical agent for effectively detoxifying cyanide-containing water which avoids the production of harmful acids and/or excessive amounts of heavy metal reaction products.

It is an even further object of the invention to provide a chemical agent for effectively detoxifying cyanide-containing water which produces a reaction product which is highly stable and does not dissociate back into harmful, toxic materials.

In accordance with the foregoing objects, the present invention involves a unique and highly effective method for treating cyanide-containing water in order to remove free cyanide therefrom and ultimately detoxify the water. For the purposes of this invention, the term "free cyanide" shall be defined to include but not be limited to HCN and/or $CN^-$ as described in greater detail below. Cyanide-contaminated water is an especially significant problem in the gold processing industry. As described above, cyanide compounds (e.g. NaCN) are used in solution form to remove gold from powdered rock and/or larger individual portions of rock arranged in piles. This is accomplished by the formation of a water-soluble gold cyanide complex from the gold and the cyanide solution. After the removal of gold from the gold cyanide complex (which is typically accomplished by the precipitation of metallic gold onto a bed of metallic zinc), both the remaining solution and/or rock materials must be treated to reduce the free cyanide levels therein in order for detoxification to occur. In accordance with the present invention, this is accomplished through the use of a unique chemical complex which substantially avoids the foregoing disadvantages associated with prior cyanide removal/detoxification methods. This complex consists of a crystalline structure having the following formula: $(Fe\cdot Zn)SO_4\cdot 7H_2O$. It is generated as a waste by-product of the metal galvanizing industry, and is in the form of greenish-blue crystals each having a size of about 10–30 U.S. standard mesh. In the galvanizing industry, this product is conventionally known as "galvanizer-crystals". Since the product was first generated only in about the last ten years, and because it is a waste material having no prior utility, there is virtually no published information on it. Structurally, the material is very complex, and it always contains both iron and zinc. It is never a single metal sulfate, and is not a mixture of ferrous sulfate heptahydrate and zinc sulfate heptahydrate. The crystal structure of the material is similar to ferrous sulfate heptahydrate, but is uniquely distorted by the partial replacement of iron by zinc in the crystal lattice. In the crystalline structure, the % by weight of zinc may theoretically vary between about 0–21% (e.g. greater than about 0% and less than about 21%), depending on the amount of iron which has been replaced by zinc. However, in a preferred embodiment, the % by weight zinc content will be between about 1–14%. Within this range, about 1–7% by weight zinc is preferred for use in processes involving powdered rock materials (about 2–6% by weight=optimum), with about 7–14% by weight zinc being preferred in processes involving the treatment of piles containing individual portions of rock (about 9–12% by weight=optimum).

In order to treat cyanide-contaminated water used in the processing of gold ore as described above, about 1–5 pounds of the crystalline $(Fe\cdot Zn)SO_4\cdot 7H_2O$ complex (about 2–3 pounds=optimum) are added to the cyanide-contaminated water per ton of rock (ore) being processed. For example, if 1 ton of ore (e.g. powdered rock or individual portions of rock) is being treated with water containing cyanide therein as described above, this water (after gold extraction) is combined with about 1–5 pounds (about 2–3 pounds=optimum) of the $(Fe\cdot Zn)SO_4\cdot 7H_2O$ complex of the present invention. As a result, a solid Zn·Fe ferrocyanide complex is produced having the following formula: $Zn_2Fe(CN)_6$. This product is very stable, substantially non-toxic, and is readily removed from the treated solution using conventional filtration techniques if desired. In addition, the production thereof removes toxic free cyanide from the water without genera harmful acids, heavy metals, excessive iron levels, high pH levels, and/or other undesired by-products/reactions. The chemical complex described herein is highly economical to use compared with other cyanide treatment agents because it is a waste material/by-product which is normally discarded by metal galvanizers.

These and other objects, features, and advantages of the present invention shall be described below in the following Brief Description of the Drawings and Detailed Description of Preferred Embodiments.

BRIEF DESCRIPTION OF THE DRAWINGS

FIG. 5 also graphically illustrates the dissolved Fe content in the slurry after treatment with the foregoing materials.

DETAILED DESCRIPTION OF PREFERRED EMBODIMENTS

The present invention involves a unique and highly effective method for detoxifying cyanide-containing water by reducing/eliminating free cyanide therein. For the purposes of this invention, the term "free cyanide" shall include but not be limited to HCN and/or CN. Both of these materials co-exist in equilibrium in accordance with the following reaction:

$$OH^- + HCN \rightarrow CN^- + H_2O \qquad (3)$$

Below pH 7.5, only HCN is present in solution. Above pH 11.7, only $CN^-$ is present in solution. Between pH 7.5 and 11.7, HCN and $CN^-$ co-exist in differing proportions.

The method of the invention as described herein enables detoxification of the contaminated water (e.g. free cyanide removal/elimination) in a highly economical manner without the generation of harmful chemical by-products, including but not limited to acids and free heavy metals. In addition, it should be understood that the detoxification of water containing the foregoing free cyanide materials occurs by chemically "removing" such materials from the water in order to form non-toxic compositions therefrom. More specifically, the toxic free cyanide materials are chemically converted in accordance with the present invention to non-toxic solid materials which, if desired, are readily removed using conventional filtration techniques.

The present invention shall be described herein with respect to processes involving the cyanide treatment of gold-containing rock (ore) to remove small quantities of gold therefrom. However, the invention is equally applicable to other processes in which substantial amounts of cyanide-containing water are generated, and the invention shall not be limited to use only in the processing of gold ore.

Figure 1:
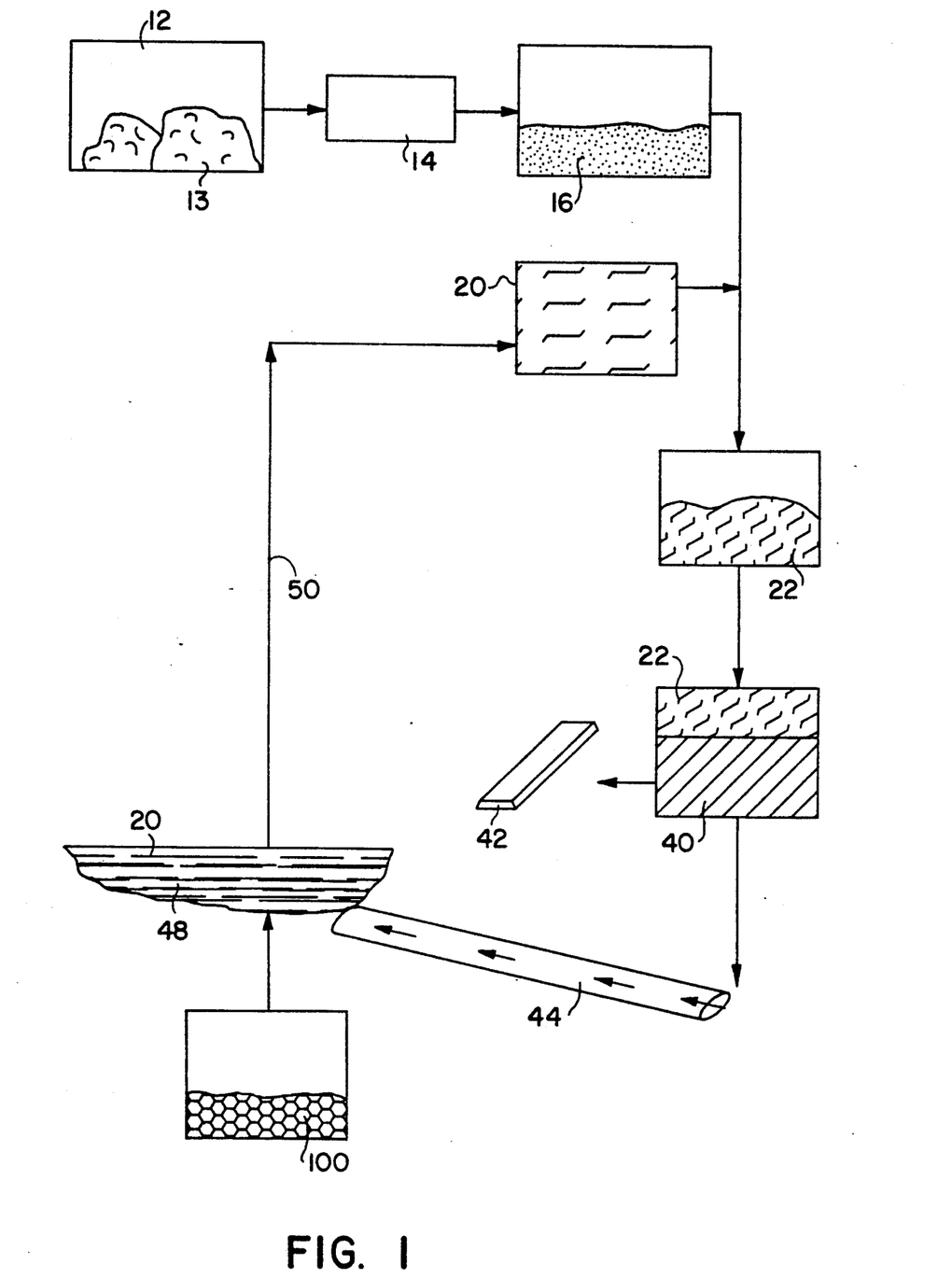
FIG. 1 is a schematic representation of a first exemplary gold processing operation with which the detoxification method of the present invention may be used.
Figure 2:
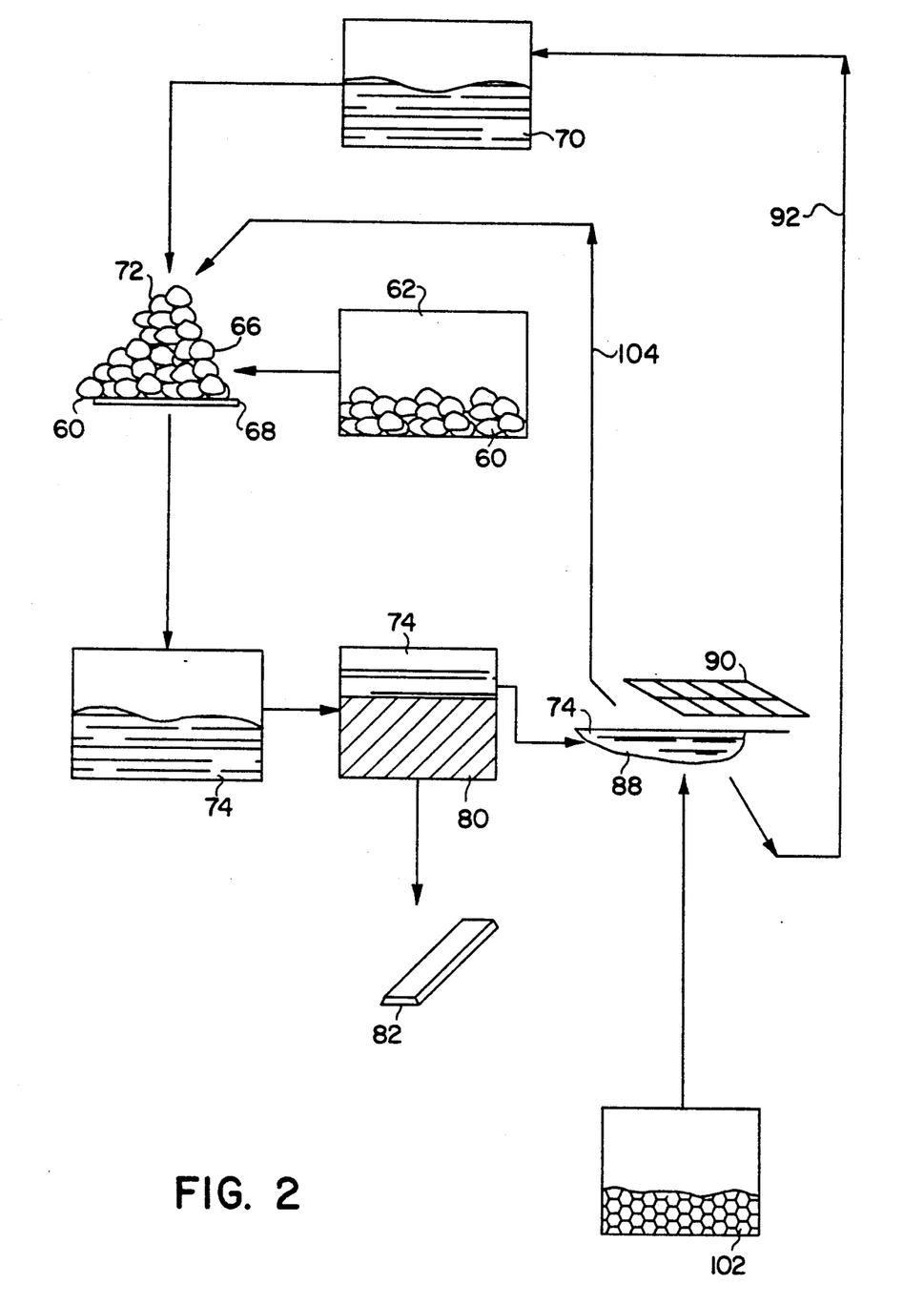
FIG. 2 is a schematic representation of a second exemplary gold processing operation with which the detoxification method of the present invention may be used.

By way of background, two major processes for the removal of gold from rock are schematically illustrated in FIGS. 1 and 2. The basic technology associated with these processes is well known in the art and generally described in Thomas, R. (ed.), *E/MJ Operating Handbook of Mineral Processing*, McGraw-Hill, Inc., pp. 22-23 (1977), which is incorporated herein by reference. With reference to FIG. 1, the first major process (hereinafter "process (1)") is schematically presented. Specifically, a supply of raw gold ore 12 is provided which consists of large rocks 13 shipped from a mine site. The rocks 13 are then crushed using a conventional milling assembly 14 known in the art which preferably consists of a jaw-crusher and attrition mill. The resulting product consists of powdered rock 16 having an average particle size of about 200 U.S. standard mesh. The powdered rock 16 is then combined with a cyanide-containing treatment solution 20 in order to form a slurry 22.

The cyanide treatment solution 20 is prepared by the dissolution in water of one or more cyanide-containing compounds which are known in the art for gold extraction, including but not limited to NaCN and/or Ca(CN)$_2$. The amount of cyanide-containing compound used to prepare the cyanide treatment solution 20 will vary, depending on the concentration of gold in the ore. However, as a general rule, the cyanide treatment solution 20 will contain about 0.05% by weight dissolved cyanide-containing compound (e.g. NaCN). In addition, the amount of cyanide treatment solution 20 which is ultimately used will vary in view of a number of parameters, including but not limited to the amount of ore 12 being processed, as well as the projected gold content of the ore 12. However, as a general rule, about 1-1.5 tons of cyanide treatment solution 20 per ton of ore 12 will be used in a preferred embodiment.

Free cyanide in the cyanide-containing treatment solution 20 immediately reacts with the powdered rock 16 in the slurry 22 to produce a water-soluble gold complex in the slurry 22. This complex consists of NaAu(CN)$_2$ when NaCN is used and CaAu(CN)$_3$ when Ca(CN)$_2$ is used. The slurry 22 is thereafter treated in order to recover metallic gold from the water-soluble gold complex. In a preferred embodiment, this is accomplished by passage of the slurry 22 over a bed 40 of metallic zinc which causes the precipitation of metallic gold thereon in accordance with the following reaction involving the removal of gold from NaAu(CN)$_2$:

$$NaAu(CN)_2 + 2NaCN + Zn + H_2O \rightarrow Na_2Zn(CN)_4 + Au + H^+ + NaOH \qquad (4)$$

Gold is electronegative to zinc in cyanide solutions, thereby enabling zinc to act as a precipitating agent with respect to the water-soluble gold complexes described above. This process is generally discussed in greater detail in Clennell, J., *The Cyanide Handbook*, McGraw-Hill, Inc., pp. 102-132 (1915) which is incorporated herein by reference as indicated above. Once the metallic gold 42 is collected and removed from the bed 40, the remaining slurry 22 is transferred via a conduit 44 to a storage pond 48 which may ultimately be as large as one or more acres (e.g. sometimes as large as 200 acres). The slurry 22 at this point consists of nearly all the powdered rock 16 in combination with water having a high residual free cyanide level therein. In time, the powdered rock 16 settles, thereby separating the powdered rock 16 from the residual cyanide treatment solution 20. The solution 20 at this stage contains about 70-180 ppm of free cyanide remaining therein, and may be recycled back into the gold processing system via line 50 as schematically illustrated in FIG. 1.

However, environmental problems frequently occur with respect to the pond 48 of cyanide-containing water which remains outside in the environment (at least temporarily). At the cyanide concentration levels indicated above (e.g. about 70-180 ppm), the water is lethal to animal life (e.g. birds and water fowl). In prior years, substantial amounts of water fowl have died after drinking from ponds containing cyanide-contaminated water produced in accordance with the foregoing process. To control this problem in the United States, the U.S. Environmental Protection Agency has prepared voluntary guidelines suggesting that gold producers reduce free cyanide levels in the pond 48 to less than about 50 ppm. This may be accomplished in accordance with the present invention in a highly effective manner as described in greater detail below.

The second main gold processing method (hereinafter "process (2)") is schematically illustrated in FIG. 2. Specifically, individual portions 60 of raw, low grade gold-containing rock (ore) 62 (each portion 60 being about 1-4 inches in diameter) are organized in a pile 66 which is placed on top of a pad 68 made of rubber or the like. In a preferred embodiment, each pile 66 is about 30-50 ft. tall and occupies about $10^7$ to $3 \times 10^7$ ft$^3$ of space. Thereafter, a cyanide treatment solution 70 comparable to the cyanide treatment solution 20 in content, concentration, and application rate is applied to the top 72 of the pile 66. As the cyanide treatment solution 70 travels downwardly into and through the pile 66, it passes into the interior regions of the individual portions 60 of rock. This is possible because the individual portions 60 of rock are each substantially porous. As a result, the collected cyanide treatment solution 74 after passage through the pile 66 includes a water-soluble gold complex therein which is comparable to the water-soluble gold complex described above in process (1). In process (2), the water-soluble gold complex is formed upon the extraction of gold from the individual portions 60 of rock by the initial cyanide treatment solution 70. Metallic gold is thereafter recovered from the collected cyanide treatment solution 74 containing the gold complex in the same manner indicated above and described in Clennell, J., supra. Specifically, the solution 74 is passed over a bed 80 of metallic zinc which causes the precipitation of metallic gold 82 therefrom. Once the metallic gold 82 is collected and removed, the remaining collected cyanide treatment solution 74 is reused as desired and needed. However, immediately prior to reuse, the solution 74 is received and retained within a pond 88 which is sufficiently small (e.g. about 0.10–0.25 acres) to be covered with protective wire mesh 90 as shown in FIG. 2. When reuse of the solution 74 in the pond 88 is desired, it is routed back into the system via recycle line 92 schematically illustrated in FIG. 2.

The immediate environmental problems caused by the large stationary pond 48 in process (1) do not exist with respect to the small pond 88 in process (2) which is protectively covered as noted above. However, problems result in process (2) when the individual portions 60 of rock being treated have all of the desired gold removed therefrom. At that point, the portions 60 of rock are ready for return to the environment. However, any cyanide-containing water retained within the porous internal structures of the portions 60 of rock, as well as any collected cyanide treatment solution 74 remaining in the pond 88 after termination of mining operations must be treated for the detoxification thereof. This would normally involve the reduction of free cyanide levels therein to below about 0.2 ppm. This is the level necessary to place the water in compliance with most applicable ground water standards throughout the United States. Again, the materials and methods of the present invention may be used to accomplish this goal in a highly efficient manner as described below.

Specifically, in order to reduce the level of toxic remaining free cyanide materials in the collected cyanide treatment solutions 20, 74 in the ponds 48, 88 (and in any solution remaining within the portions 60 of rock in process (2)), a special and unique crystalline chemical complex is added thereto. Specifically, this material has the following formula: $(Fe \cdot Zn)SO_4 \cdot 7H_2O$. It is generated as a waste by-product of the metal galvanizing industry, and is in the form of greenish-blue crystals each having a size of about 10–30 U.S. standard mesh. In the galvanizing industry, these crystals are conventionally known as "galvanizer-crystals". Since this product was first generated only in about the last ten years, and because it is a waste material having no prior known utility, there is virtually no published information on it.

Structurally, the material is very complex, and it always contains both iron and zinc. It is never a single metal sulfate, and is not a mixture of ferrous sulfate heptahydrate and zinc sulfate heptahydrate. As indicated above, it is a waste by-product resulting from the galvanizing of steel. Galvanizing basically involves the formation of a protective zinc coating on steel components using a process well known in the art as described in *The Making, Shaping, and Treating of Steel*, a publication of the Unites States Steel Company, Pittsburgh, Pa., 6th ed. (1952), pp. 935–939, which is incorporated herein by reference. One step in the galvanizing process involves immersion of the steel into an aqueous sulfuric acid solution in order to clean the steel of various metallic and non-metallic residues. In actual use, the acid solution contains dissolved iron and zinc. The iron comes from the cleaning of previous portions of steel in the acid solution which is reused many times for this purpose. The zinc also comes from cleaning previously-galvanized steel which had not been properly galvanized. Improperly galvanized steel releases zinc upon contact with the acid solution. Ultimately, the acid solution becomes sufficiently saturated with iron and zinc to prevent its continued use as a cleaning solution. At this point, it is cooled from its initial temperature of about 140° F. to a temperature of about 20° F. in order to cause the formation of crystalline materials therein conventionally known as "galvanizer crystals" which consist of $(Fe \cdot Zn)SO_4 \cdot 7H_2O$.

The crystalline structure of $(Fe \cdot Zn)SO_4 \cdot 7H_2O$ is very complex and similar to ferrous sulfate, but distorted by the partial replacement of iron by zinc in the crystal lattice. With respect to the formation of this material, the solubility curves for ferrous sulfate heptahydrate and zinc sulfate heptahydrate are very similar, and these materials therefore tend to precipitate together upon cooling. However, because iron and zinc have substantially the same ionic radius (0.74 angstroms), they are easily interchangeable in the same crystal lattice. Thus, when crystal formation occurs as described above, a single sulfate is produced, namely, a combination iron/zinc sulfate. More specifically, the crystal lattice is predominantly a ferrous sulfate heptahydrate lattice with zinc replacing iron in various portions of the lattice because of the comparable size and charge characteristics of zinc and iron. Notwithstanding the foregoing information, very little is known regarding the structural and physical characteristics of the $(Fe \cdot Zn)SO_4 \cdot 7H_2O$ crystals. In fact, this material had previously existed only as a waste by-product having no known use or utility as previously noted.

However, in the crystalline structure of $(Fe \cdot Zn)SO_4 \cdot 7H_2O$, the extent of iron replacement by zinc depends on the amount of zinc present in the acid solution described above which is used in the galvanizing process. Accordingly, the % by weight of zinc in the crystal lattice may theoretically vary between about 0–21% (e.g. greater than about 0% and less than about 21%). However, under most circumstances, the lattice will contain more iron than zinc. In a preferred embodiment, the $(Fe \cdot Zn)SO_4 \cdot 7H_2O$ galvanizer crystals will function most effectively to diminish toxic free cyanide levels in contaminated water when the % by weight zinc content thereof is between about 1–14%. Within this range, about 1–7% by weight zinc (about 2–6% by weight=optimum) is preferred for use in process (1) described above, with about 7–14% by weight zinc (about 9–12% by weight=optimum) being preferred in process (2).

As previously indicated, the $(Fe \cdot Zn)SO_4 \cdot 7H_2O$ crystals used in accordance with the present invention are known by-products of conventional metal galvanizing processes. Large quantities of (Fe·Zn)SO$_4$·7H$_2$O crystals are commercially available from a number of sources including but not limited to the following: Valmont Industries of Valley, NE (U.S.A.); Lindsay Manufacturing of Lindsay, Nebr. (U.S.A.); Pacific Galvanizing of Oakland, Calif. (U.S.A.); Los Angeles Galvanizing Company of Huntington Park, Calif. (U.S.A.); and Kortick Manufacturing Company of San Francisco, Calif. (U.S.A.).

In order to treat cyanide-contaminated water generated during the processing of gold ore as described above, between about 1-5 pounds of the (Fe·Zn)SO$_4$·7H$_2$O crystals (about 2-3 pounds=optimum) are added to the cyanide-containing water per ton of rock (ore) being processed. For example, if 1 ton of ore (e.g. powdered rock or individual portions of rock) is being treated with a cyanide treatment solution as described above, the collected cyanide-containing solution from this process (after gold extraction) is combined with about 1-5 pounds (about 2-3 pounds=optimum) of the (Fe·Zn)SO$_4$·7H$_2$O crystals.

Addition of a supply 100 of the (Fe·Zn)SO$_4$·7H$_2$O crystals to the cyanide treatment solution 20 contained within pond 48 (having remaining free cyanide therein) is schematically illustrated in FIG. 1. Likewise, the addition of a supply 102 of the (Fe·Zn)SO$_4$·7H$_2$O crystals to the collected cyanide treatment solution 74 in the pond 88 is schematically illustrated in FIG. 2. In addition, in process (2), the individual portions 60 of rock should also be treated in order to remove remaining free cyanide from any of the treatment solution retained in the interior regions thereof. To accomplish this, the collected cyanide treatment solution 74 retained within pond 88 may be routed via line 104 into the pile 66 of rock after the addition of (Fe·Zn)SO$_4$·7H$_2$O crystals to the pond 88. If (Fe·Zn)SO$_4$·7H$_2$O crystals are added to the pond 88 within the quantity ranges specified herein, excess (Fe·Zn)SO$_4$·7H$_2$O will be present in the pond 88 because of its relatively small size (compared with pond 48 in process (1)). The excess (Fe·Zn)SO$_4$·7H$_2$O may then be used to effectively treat cyanide-containing solution held within the individual portions 60 of rock in the pile 66 as indicated above.

From a chemical standpoint, when (Fe·Zn)SO$_4$·7H$_2$O crystals are added to solutions containing toxic remaining free cyanide materials as defined herein, a stable, substantially non-toxic Zn·Fe ferrocyanide complex is produced. The Zn·Fe ferrocyanide complex is currently understood to have the following formula: Zn$_2$Fe(CN)$_6$. This material precipitates from the solutions being treated as a solid product, and is therefore readily removed (if desired) using conventional means, including but not limited to vacuum filtration and the like. Accordingly, the production of this material successfully removes any remaining toxic free cyanide from the water while generating a substantially non-toxic, easily removable solid material therefrom. In fact, using the (Fe·Zn)SO$_4$·7H$_2$O crystals in the amounts specified herein, a supply of contaminated water having a free cyanide concentration of about 70-180 ppm can be appropriately treated to reduce this concentration level to about 1.0 ppm or less which is substantially non-toxic to human and animal life.

Use of the (Fe·Zn)SO$_4$·7H$_2$O crystals described herein offers numerous advantages over prior cyanide treatment materials. For example, compared with conventional oxidants as described above (e.g. SO$_2$, H$_2$O$_2$ and hypochlorites), the costs associated with the use of (Fe·Zn)SO$_4$·7H$_2$O crystals are almost negligible. As noted above, (Fe·Zn)SC$_4$·7H$_2$O crystals currently have no other use, and are a waste material. In addition, unlike oxidant materials, the (Fe·Zn)SO$_4$·7H$_2$O crystals can be used in connection with processes (1) and (2) of the present invention without the leaching of other harmful metals from the ore.

In addition, use of the (Fe Zn)SO$_4$·7H$_2$O crystals offers numerous advantages over conventional complexing agents. First, the (Fe·Zn)SO$_4$·7H$_2$O crystals react with free cyanide materials as defined herein to produce reaction products which are highly stable and do not dissociate back into free cyanide. The use of zinc sulfate heptahydrate as a complexing agent results in the formation of Zn(CN)$_2$. This material thereafter reacts with excess free cyanide ions to form Zn(CN)$_4^{-2}$ which is a weak composition that readily dissociates to form even more free cyanide ions.

In addition, the use of (Fe·Zn)SO$_4$·7H$_2$O crystals does not liberate free metal materials into the solutions being treated. This normally occurs when ferrous sulfate heptahydrate is used (which liberates substantial amounts of iron into the water). Thus, the (Fe·Zn)SO$_4$·7H$_2$O composition of the present invention offers numerous benefits which are not available if ferrous sulfate heptahydrate or zinc sulfate heptahydrate is used. These benefits are further described and characterized below in the following examples:

EXAMPLE 1

Deionized water doped with 206 ppm of CN$^-$ was treated with equal amounts of ferrous sulfate heptahydrate and (Fe·Zn)SO$_4$·7H$_2$O crystals. Two types of (Fe·Zn)SO$_4$·7H$_2$O crystals were individually tested. One type had a zinc level of 6% by weight and the other type had a zinc level of 11% by weight. The CN. was deliberately added at a much higher level than conventionally found in the gold processing industry. This was done to achieve a reaction end-point (with CN$^-$) so that the effectiveness of (Fe·Zn)SO$_4$·7H$_2$O crystals to remove CN$^-$ could be directly compared with ferrous sulfate heptahydrate.

Figure 3:
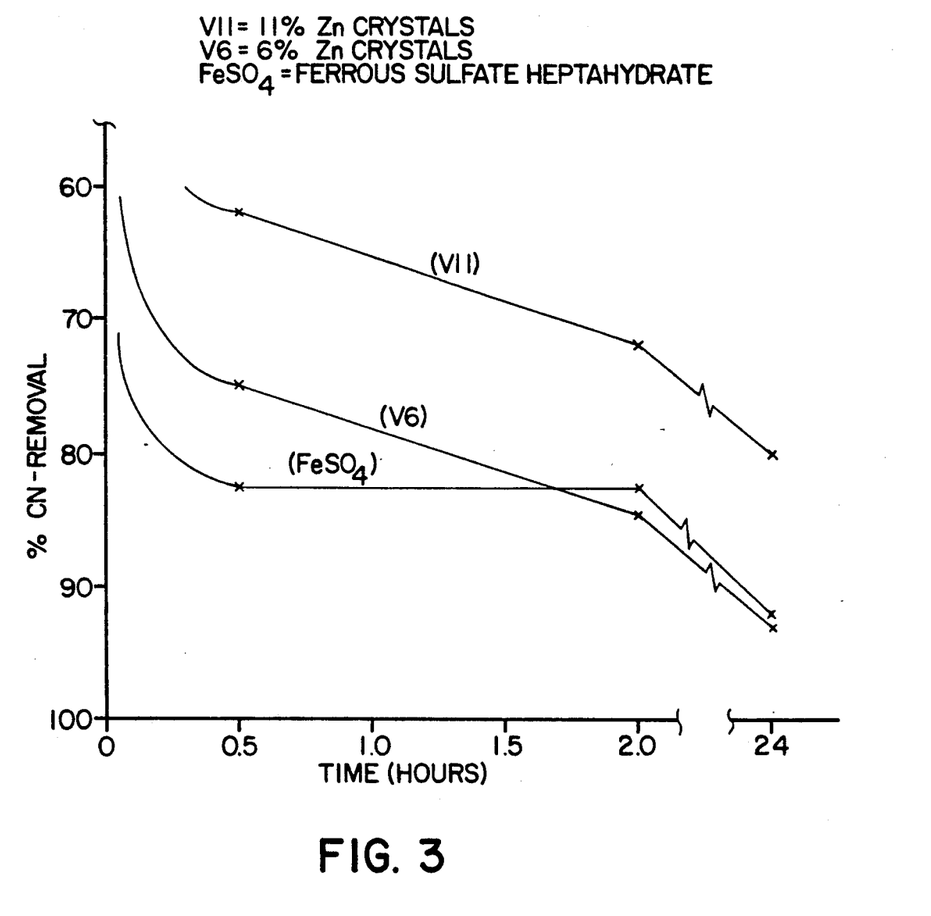
FIG. 3 is a graphic illustration of free cyanide reduction/elimination (e.g. detoxification) in a cyanide-containing solution over time using (a) $FeSO_4\cdot 7H_2O$; (b) $(Fe\cdot Zn)SO_4\cdot 7H_2O$ crystals containing 6% by weight Zn; and (c) $(Fe\cdot Zn)SO_4\cdot 7H_2O$ crystals containing 11% by weight Zn.
Figure 4:
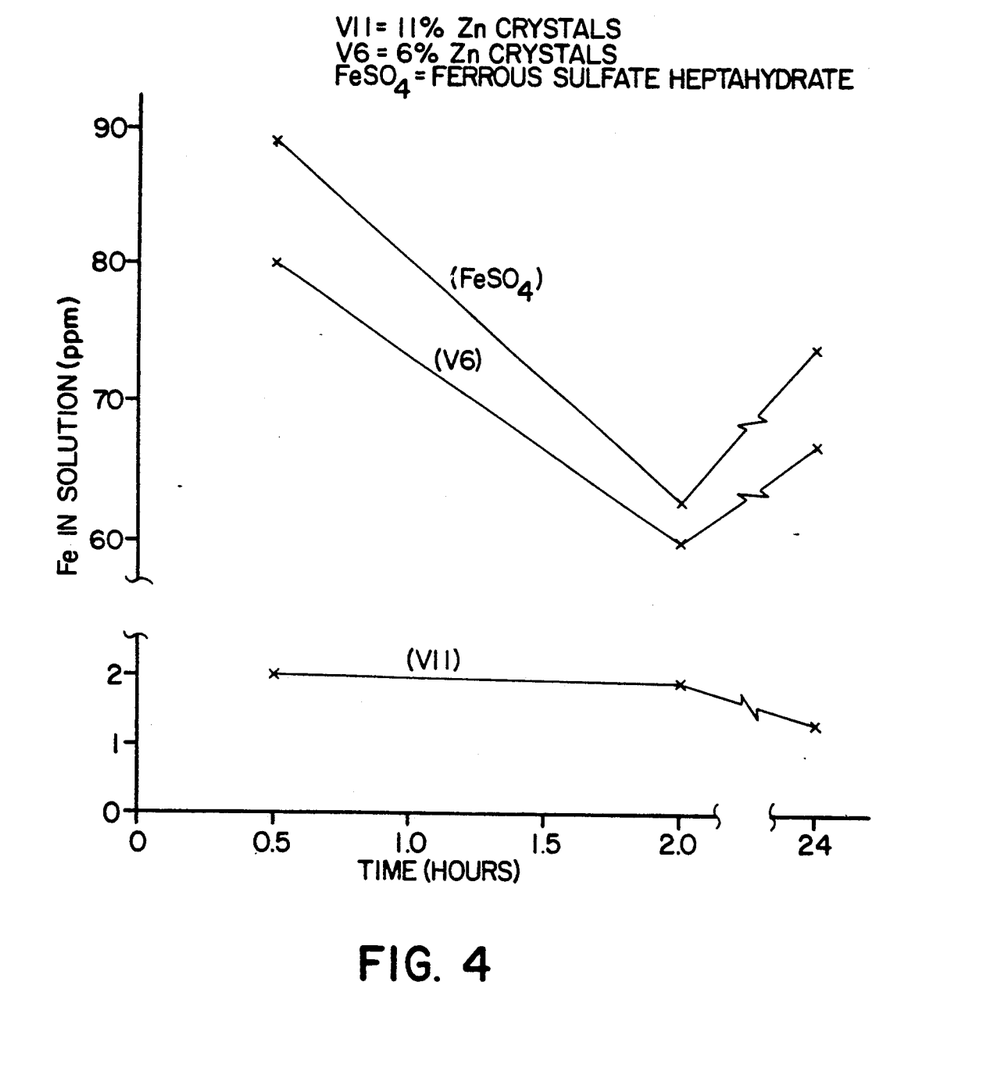
FIG. 4 is a graphic illustration of the dissolved Fe content of the solution of FIG. 3 after treatment with (a) $FeSO_4\cdot 7H_2O$; (b) $(Fe\cdot Zn)SO_4\cdot 7H_2O$ crystals containing 6% by weight Zn; and (c) $(Fe\cdot Zn)SO_4\cdot 7H_2O$ crystals containing 11% by weight Zn.

The results of this Example are graphically illustrated in FIGS. 3 and 4. After 24 hours, both the 6% zinc crystals and the ferrous sulfate heptahydrate had eliminated about 90-95% of the free cyanide (e.g. CN$^-$). The 11% zinc crystals eliminated about 80% of the free cyanide. This test clearly illustrates that the 6% zinc crystals functioned in an equally effective manner compared with the ferrous sulfate heptahydrate. It should also be noted that the effectiveness of the 6% zinc crystal material can be achieved at almost no cost since it is a waste product, compared with ferrous sulfate heptahydrate which has a higher cost. In addition, use of the 6% zinc crystals as shown in this Example also provides another substantial benefit compared with ferrous sulfate heptahydrate. This benefit involves the ability of the 6% zinc and 11% zinc crystals to release substantially smaller amounts of iron into the solution as graphically represented in FIG. 4. Specifically, the 6% zinc crystals resulted in about 67 ppm of dissolved iron in solution after 24 hours, compared with about 74 ppm of dissolved iron in solution when ferrous sulfate heptahydrate was used over the same time period. In addition, the 11% zinc crystals only resulted in the presence of about 1-2 ppm of dissolved iron in solution after 24 hours. As previously indicated, excess amounts of dissolved iron in water can present significant environmental problems, possibly causing the violation of applicable ground water regulations.

Accordingly, this Example clearly indicates that the (Fe·Zn)SO$_4$·7H$_2$O crystals of the present invention may be used in place of ferrous sulfate heptahydrate to achieve equal results at a lower cost and with a smaller amount of iron remaining in solution.

EXAMPLE 2

This example involves two separate tests. Both tests used actual rock slurries obtained from FMC Gold, Inc. at a mine site in Gabbs, NV. In the first test, a slurry was used having 130 ppm of CN$^-$ therein. This slurry was combined with equal amounts (e.g. about 2 lb./ton or ore) of ferrous sulfate heptahydrate and 6% zinc (Fe·Zn)SO$_4$·7H$_2$O crystals. In the second test, a slurry was used which had 75 ppm of CN$^-$. Equal amounts (e.g. about 2 lb./ton of ore) of ferrous sulfate heptahydrate and 11% zinc (Fe·Zn)SO$_4$·7H$_2$O crystals were used. The results of these tests are graphically shown in FIGS. 5-6, respectively.

Figure 5:
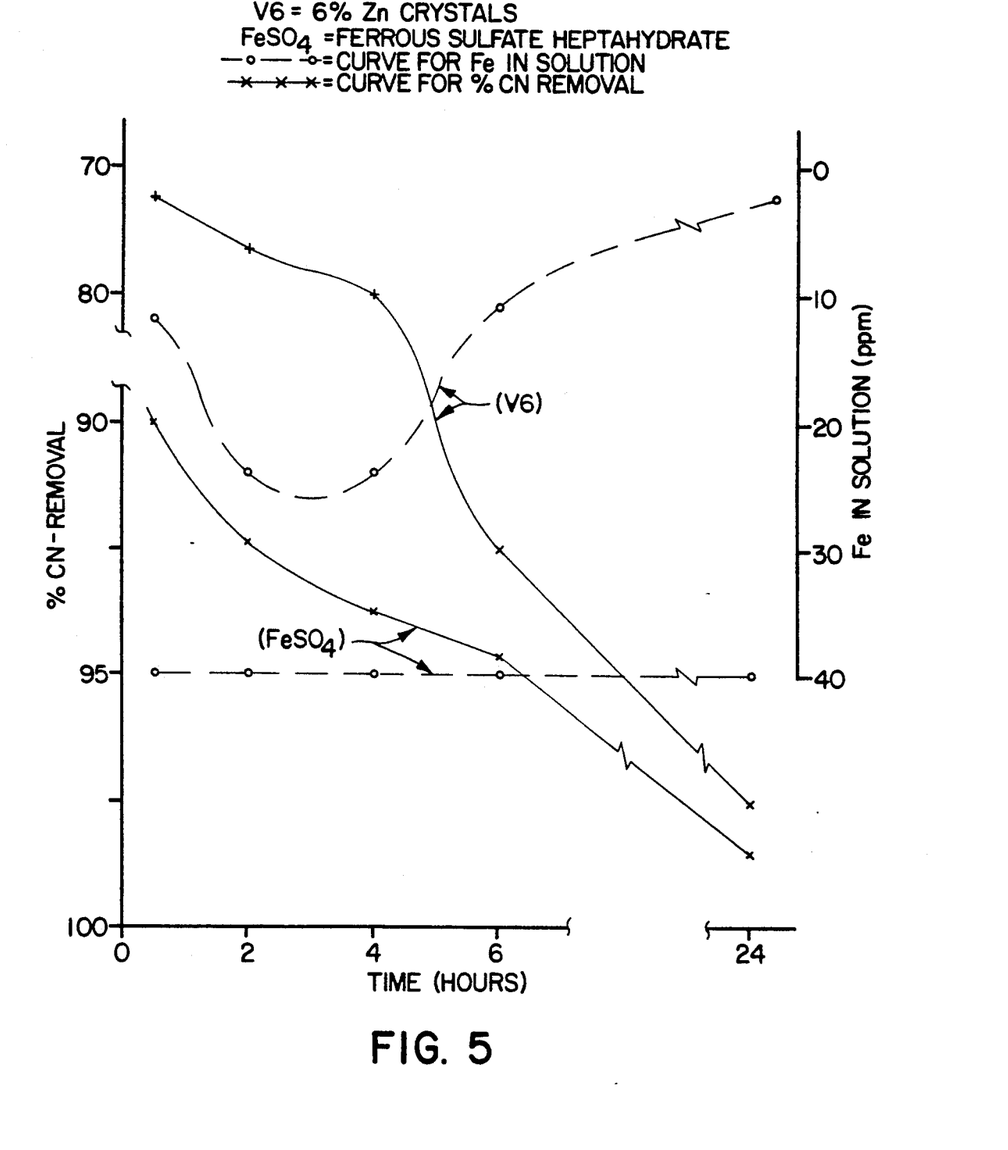
FIG. 5 is a graphic illustration of free cyanide reduction/elimination (e.g. detoxification) in an actual rock-containing slurry after treatment with (a) $FeSO_4\cdot 7H_2O$; and (b) $(Fe\cdot Zn)SO_4\cdot 7H_2O$ crystals containing 6% by weight Zn.

With reference to FIG. 5, the 6% zinc crystals eliminated about 97% of the free cyanide (e.g. CN$^-$) after 24 hours, While the ferrous sulfate heptahydrate eliminated nearly the same amount of free cyanide (e.g. about 98%). However, after 24 hours, the slurry treated with the ferrous sulfate heptahydrate had about 40 ppm of dissolved iron therein, while the slurry treated with the 6% zinc crystals only had about 3 ppm of dissolved iron therein after 24 hours.

Figure 6:
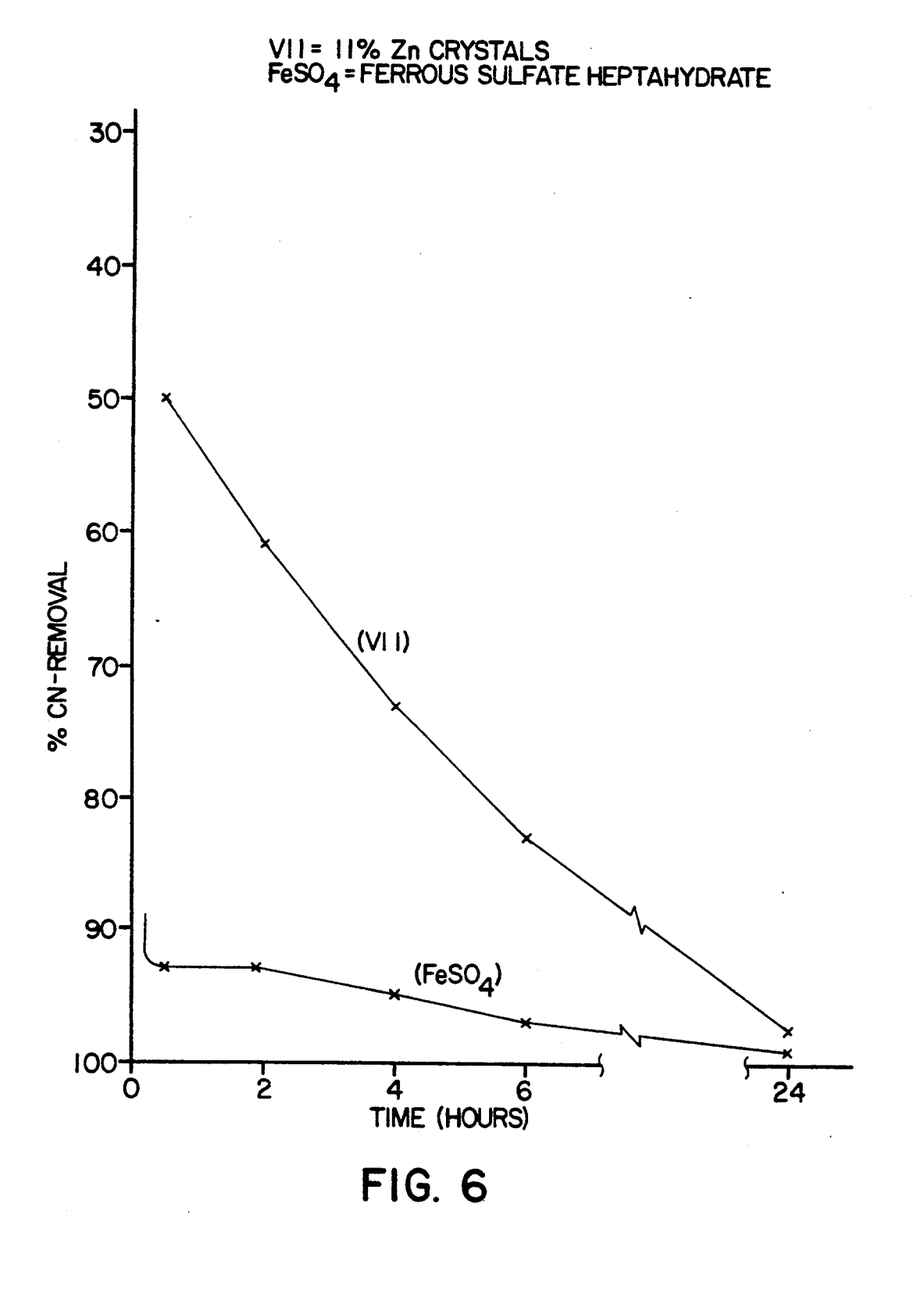
FIG. 6 is a graphic illustration of the amount of free cyanide reduction/elimination (e.g. detoxification) in an actual rock-containing slurry after treatment with (a) $FeSO_4\cdot 7H_2O$; and (b) $(Fe\cdot Zn)SO_4\cdot 7H_2O$ crystals containing 11% by weight Zn.

As shown in FIG. 6, the ferrous sulfate heptahydrate eliminated about 98% of the free cyanide (e.g. CN$^-$) from the slurry, while the 11% zinc crystals eliminated almost the same amount (e.g. about 96%).

Accordingly, these tests again illustrate that the (Fe·Zn)SO$_4$·7H$_2$O crystals of the present invention may be used in an equally effective manner compared with ferrous sulfate heptahydrate while avoiding the generation of excess dissolved iron in the solutions being treated.

Thus, use of the (Fe·Zn)SO$_4$·7H$_2$O crystals as described herein to remove/eliminate free cyanide materials from cyanide-containing water in gold processing operations represents a substantial advance in the art of environmental protection. Implementation of the present invention enables toxic free cyanide materials to be removed from the water and replaced with a substantially non-toxic solid material which is extremely stable and readily removable. Likewise, this is accomplished at a minimal cost compared with other cyanide control agents because the (Fe·Zn)SO$_4$·7H$_2$O crystals as described above are essentially waste products. Furthermore, the (Fe·Zn)SO$_4$·7H$_2$O crystals do not produce any significant amounts of adverse reaction by-products, including but not limited to acids, heavy metals, and readily dissociable cyanide complexes.

Having herein described preferred embodiments of the present invention, it is anticipated that suitable modifications may be made thereto by individuals skilled in the art which remain within the scope of the invention. For example, the invention shall not be limited to the specific gold mining, processing, and recovery methods described above. Furthermore, the invention shall not be limited to use only in the gold processing industry. Thus, the present invention shall only be construed in accordance with the following claims:

The invention that is claimed:

1. A method for detoxifying cyanide-containing water by removing free cyanide therefrom comprising the steps of:
   providing a supply of water comprising free cyanide therein;
   combining a cyanide treatment agent with said supply of water, said cyanide treatment agent comprising (Fe·Zn)SO$_4$·7H$_2$O; and
   allowing said cyanide treatment agent to react with said free cyanide in said supply of water in order to form a non-toxic ferrocyanide complex from said free cyanide.

2. The method of claim 1 wherein said cyanide treatment agent comprises about 1-14% by weight zinc.

3. The method of claim 1 wherein said cyanide treatment agent comprises about 2-6% by weight zinc.

4. The method of claim 1 wherein said cyanide treatment agent comprises about 9-12% by weight zinc.

5. The method of claim 1 wherein said ferrocyanide complex comprises Zn$_2$Fe(CN)$_6$.

6. The method of claim 1 wherein said cyanide treatment agent is in the form of a plurality of individual crystals, each of said crystals having a size equal to about 10-30 U.S. standard mesh.

7. In a cyanide-based gold extraction process comprising the steps of:
   (A) providing a supply of powdered gold ore; and
   (B) contacting said supply of powdered gold ore with a solution comprising free cyanide therein, wherein said contacting of the powdered gold ore with the solution results in extraction of gold from said powdered gold ore and leaves a residual cyanide containing solution,
   a method for detoxifying the residual cyanide containing solution in order to remove free cyanide therefrom wherein the improvement comprises:
   combining said residual cyanide containing solution with a cyanide treatment agent comprising (Fe·Zn)SO$_4$·7H$_2$O; and
   allowing said cyanide treatment agent to react with free cyanide in the residual cyanide containing solution in order to form a non-toxic ferrocyanide complex.

8. The method of claim 7 wherein said cyanide treatment agent comprises about 1-14% by weight zinc.

9. The method of claim 7 wherein said cyanide treatment agent comprises about 2-6% by weight zinc.

10. The method of claim 7 wherein said ferrocyanide complex comprises Zn$_2$Fe(CN)$_6$.

11. The method of claim 7 wherein said cyanide treatment agent is in the form of a plurality of individual crystals, each of said crystals having a size equal to about 10-30 U.S. standard mesh.

12. The method of claim 7 wherein said combining of said residual cyanide containing solution with said cyanide treatment agent comprises the step of adding said cyanide treatment agent to said residual cyanide containing solution in an amount equal to about 1-5 pounds of said cyanide treatment agent per ton of said powdered gold ore.

13. The method of claim 7 wherein said combining of said residual cyanide containing solution with said cyanide treatment agent comprises the step of adding said cyanide treatment agent to said solution in an amount equal to about 2-3 pounds of said cyanide treatment agent per ton of said powdered gold ore.

14. In a cyanide-based gold extraction process comprising the steps of:

(A) providing a supply of individual portions of rock containing gold therein;
(B) arranging said portions of rock in a pile; and
(C) applying a solution comprising free cyanide therein to said pile, with said solution extracting gold as it passes downwardly through said portions of rock and leaving a residual cyanide containing solution a method for detoxifying the residual cyanide containing solution in order to remove free cyanide therefrom wherein the improvement comprises:

combining said residual cyanide containing solution with a cyanide treatment agent comprising $(Fe \cdot Zn)SO_4 \cdot 7H_2O$; and allowing said cyanide treatment agent to react with free cyanide in the residual cyanide containing solution in order to form a non-toxic ferrocyanide complex.

15. The method of claim 14 wherein said cyanide treatment agent comprises about 1–14% by weight zinc.

16. The method of claim 14 wherein said cyanide treatment agent comprises about 9–12% by weight zinc.

17. The method of claim 14 wherein said ferrocyanide complex comprises $Zn_2Fe(CN)_6$.

18. The method of claim 14 wherein cyanide treatment agent is in the form of a plurality of individual crystals, each of said crystals having a size equal to about 10–30 U.S. standard mesh.

19. The method of claim 14 wherein said combining of said residual cyanide containing solution with the cyanide treatment agent comprises the step of adding said cyanide treatment agent to said solution in an amount equal to about 1–5 pounds of cyanide treatment agent per ton of said portions of rock.

20. The method of claim 16 wherein said combining of said residual cyanide containing solution with the cyanide treatment agent comprises the step of adding said cyanide treatment agent to said residual cyanide containing solution in an amount equal to about 2–3 pounds of cyanide treatment agent per ton of said portions of rock.

* * * * *

UNITED STATES PATENT AND TRADEMARK OFFICE
CERTIFICATE OF CORRECTION

PATENT NO. : 5,264,192
DATED : November 23, 1993
INVENTOR(S) : Shutt et al.

It is certified that error appears in the above-identified patent and that said Letters Patent is hereby corrected as shown below:

Col. 6, l. 26 - delete "genera" and insert therefor -- generating --

Col. 7, l. 11 - delete "$OH^-+HCN-CN^-+H_2O$" and insert therefor
 -- $OH^-+HCN \rightleftharpoons CN^-+H_2O$ --

Col. 14, l. 64 - after "said" insert --residual cyanide containing--

Col. 16, l. 12 - after "said" insert --residual cyanide containing--

Signed and Sealed this

Nineteenth Day of July, 1994

Attest:

BRUCE LEHMAN

Attesting Officer

Commissioner of Patents and Trademarks